Aug. 1, 1939.  J. M. MARTIN  2,168,265
TRACTOR COUPLING
Filed Nov. 1, 1937   2 Sheets-Sheet 1

Inventor
JAMES M. MARTIN
By Beaman & Langford
Attorneys

Aug. 1, 1939.　　　J. M. MARTIN　　　2,168,265
TRACTOR COUPLING
Filed Nov. 1, 1937　　　2 Sheets-Sheet 2

Inventor
JAMES M. MARTIN
By Beaman & Langford
Attorneys

Patented Aug. 1, 1939

2,168,265

UNITED STATES PATENT OFFICE 2,168,265

TRACTOR COUPLING

James M. Martin, Jackson, Mich., assignor to Jaxon Farm Equipment Company, Jackson, Mich., a corporation of Michigan Application November 1, 1937, Serial No. 172,143

13 Claims. (Cl. 280—33.13)

This invention relates to a coupling for securing farm implements and the like to a tractor, and more particularly to a coupling disposed at the front of a tractor so that the implement may be pushed.

The use of multiple purpose farm tractors has been somewhat hampered by the difficulty of uncoupling one implement and coupling another. In the past the coupling and uncoupling operation often required the expenditure of a great amount of time, which was completely lost. The present invention contemplates the provision of a coupling by means of which an implement may be coupled or uncoupled by the single movement of the tractor toward or away from the implement, and the single movement of a lever requiring but a few seconds of time. Accordingly, an object of the invention is to provide a tractor coupling by means of which numerous farm implements may be operably secured to the tractor with a minimum expenditure of time and effort.

Another object of the invention is to provide a tractor coupling for connecting to the tractor various farm implements having frames with portions of predetermined configurations.

Still another object is to provide a device whereby a tractor may be driven into assembled relation with a farm implement or the like and the latter locked into position quickly.

A further object of the invention is to provide a tractor coupling having a plurality of pins which may be moved axially to engage the frame of a farm implement having a portion of a predetermined configuration.

A still further object of the invention is to provide a farm tractor having a nose on which a farm implement frame may be supported and to which it may be secured.

A still further object of the invention is to provide a tractor coupling having a plurality of axially movable implement securing pins which are simultaneously actuated by a manually operable lever.

Figure 1:
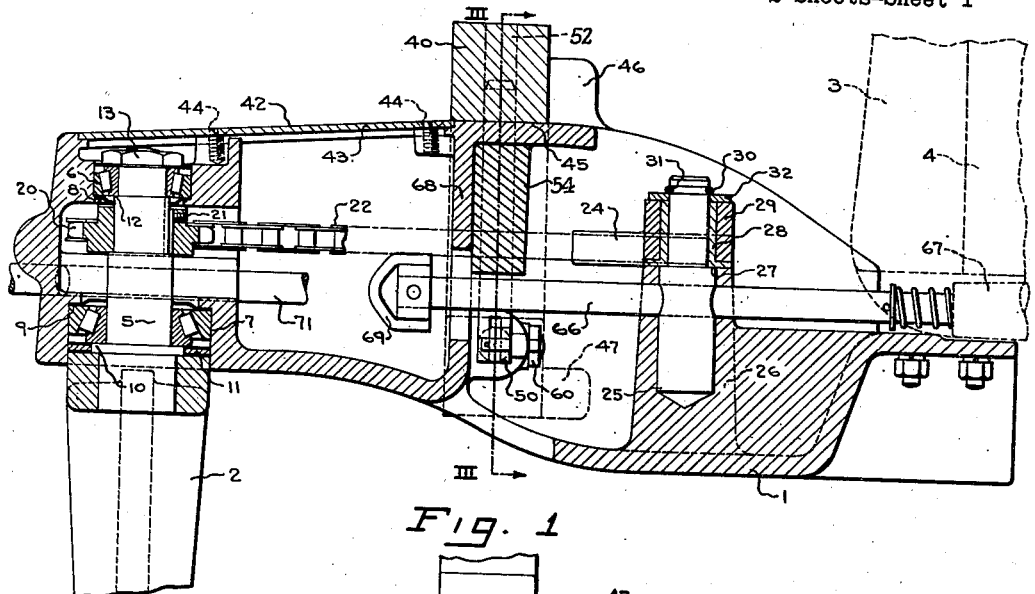
Figure 2:
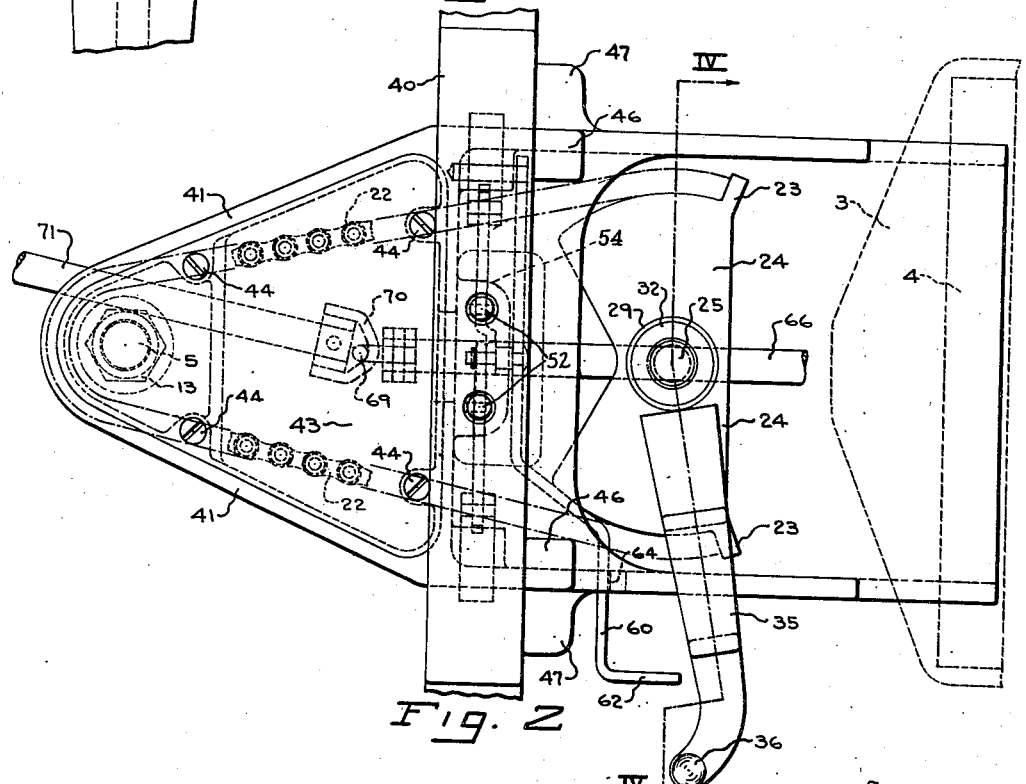
Figure 3:
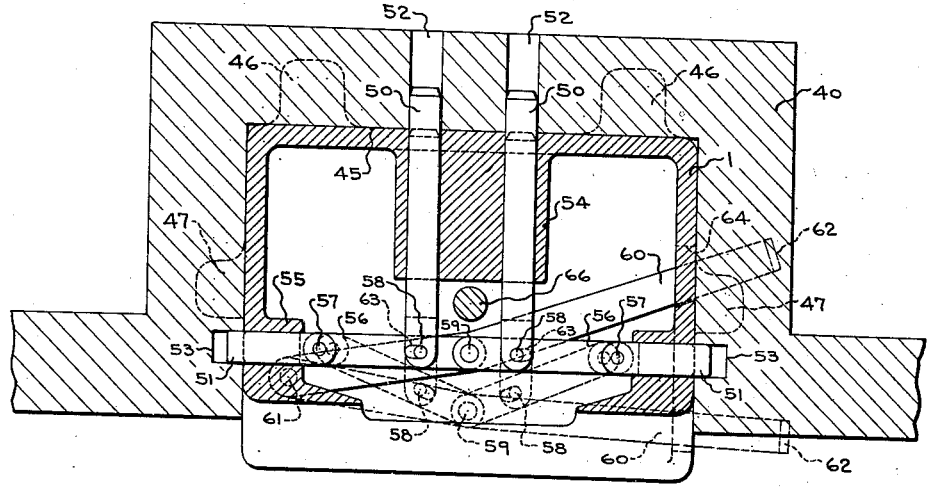
Figure 4:
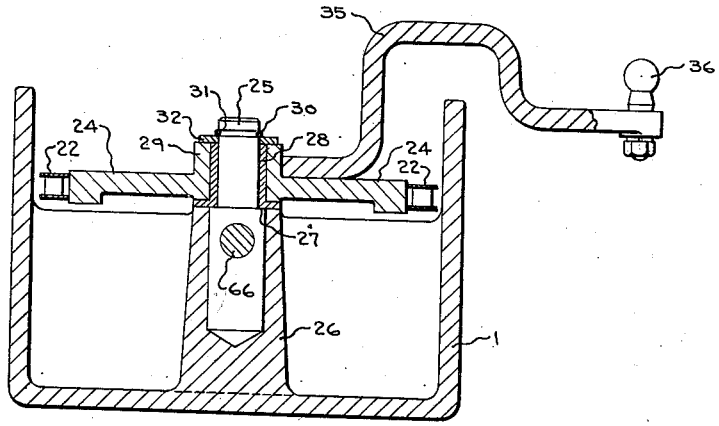

These and other objects will be apparent from the following specification when taken with the accompanying drawings, in which Fig. 1 is a partial vertical section of a multiple purpose tractor disclosing particularly the coupling nose, Fig. 2 is a plan view of the nose, Fig. 3 is a section on the line III—III of Fig. 1, and Fig. 4 is a section on the line IV—IV of Fig. 2.

Referring particularly to the drawings, the reference character 1 indicates the frame of the tractor nose, in the front portion of which are pivotally mounted the forks 2 for supporting the front wheel of the tractor. The rear portion of the nose projects from the general framework of the front of the tractor adjacent the radiator grill 3 and radiator 4.

The forks 2 which support the front of the tractor, and by which the tractor is steered, have projecting upwardly therefrom a pin 5. The pin 5 is mounted in two sets of bearings 6 and 7, respectively, seated against shoulders 8 and 9 in the frame 1. A radially projecting flange 10 on the pin 5 bears against the outer face of the inner race of the bearing 7 and about the periphery of the flange 10 is disposed a sealing ring 11. The bearing 6 is clamped against the shoulder 12 on the pin 5 by a nut 13 threaded to the outer end of the pin 5. Accordingly, movement of the pin 5 inwardly with respect to the frame 1 is prevented by the bearing 7 bearing against the shoulder 9, and movement of the pin 5 outwardly with respect to the frame 1 is prevented by the bearing 6 bearing against the shoulder 8.

The pin 5 is rotated to turn the forks 2 and thus steer the tractor by sprocket wheel 20 secured to the pin 5 by the set screw 21. The sprocket wheel 20 is driven by a chain 22, having the ends thereof secured to ears 23 projecting from the peripheral surface of segments 24, the segments 24 being rotatably mounted upon a pin 25. The pin 25 is mounted in an upstanding projection 26 from the frame 1 and has bearing against a shoulder 27, flush with the top of the projection 26, a bronze bushing 28. Disposed about the bronze bushing 28 is a collar 29, which preferably is in the form of an integral casting with the segments 24, and which oscillates about the bushing 28. The collar 29 and the bushing 28 are maintained in assembled relation on the pin 25 by a spring ring 30 disposed in a groove 31 in the pin 25 bearing against a washer 32.

The segments 24 are oscillated to drive the chain 22 by a radius arm 35 secured to the top surface of one of the segments 24, as shown particularly in Figs. 2 and 4. The radius arm 35 has secured to the outer end thereof a ball 36 to which may be secured a socket comprising a part of a conventional steering device operated from the control station of the tractor. It will thus be seen that oscillating movement imparted to the radius arm 35 will drive the sprocket wheel 20 through the chain 22 and thus control the forks 2 to steer the tractor.

The nose in which the above described structure is mounted is of such a height from the ground that it may conveniently run under a special frame portion 40, shown more clearly in Fig. 3, with which all farm implements and the like to which the tractor is to be attached are provided. The frame portion 40 in the present form of the invention has the general configuration of an inverted U and is arranged to closely engage on three sides the supporting portion of the nose, as disclosed in Fig. 3.

As disclosed in Figs. 2 and 1, respectively, the nose has forward converging sides 41, and a downwardly inclined flat surface 42 which comprises the top edges of the sides 41 and a cover plate 43 secured to the frame 1 by screws 44. When it is desired to connect a farm implement to the tractor, the frame portion 40 is supported by a horse or a jack at substantially the level of the nose. The tractor is then moved forward under its own power, the inclined sides 41 and the surface 42 of the nose camming the frame portion 40 into the position disclosed in the drawings, seated on a substantially horizontal supporting portion 45 and against the vertically extending stops 46 and the laterally extending stops 47.

When in seated position on the supporting surface 45 and against the stops 46 and 47, the frame portion 40 is located against removal from its seated position by vertically extending pins 50 and laterally extending pins 51, which project into the holes 52 and 53, respectively, in the frame portion 40. As shown particularly in Fig. 3, the pins 50 and 51 extend through lugs 54 and 55, respectively, projecting inwardly from the frame 1 and are actuated by a toggle having toggle links 56 secured at their outer ends to the pins 51 by pivots 57, and midway between their ends to the pins 50 by pivots 58. The toggle links 56 are pinned together at their inner ends by a pivot 59. Also pinned to the pivot 59 is a lever 60 at a position midway between the ends thereof, one end being pinned to the frame 1 by a pivot 61. The free end of the lever 60 extends outside of the frame 1, as shown in Fig. 2, and is provided with a handle portion 62. Thus, when it is desired to lock the frame portion 40 to the nose, the lever 60 is moved from its lower position, shown in dotted outline in Fig. 3, to its upper position, shown in full lines in Fig. 3, and to unlock the frame portion 40 from the nose the lever 60 is moved downwardly, the movement of the lever resulting in the locking and unlocking movement of the pins 50 and 51. The lower ends of the pins 50 are provided with lost motion slots 63 to accommodate the arcuate movement of the arms 56. The lever 60 is guided for its vertical movement in a slot 64 in the side of the frame 1.

For cranking the tractor there is provided an extension 66 from the crank shaft 67, the extension passing through the upright projection 26 and the pin 25, and the web 68 across the mid portion of the frame 1. The outer end of the extension 66 is provided with a closed link 69 interlocked with a second closed link 70 on the end of a crank 71. The closed link 69 and 70 form a universal joint for transmitting rotary movement from the crank 71 to the extension 66. The tractor may be then cranked in the conventional manner from the forward end of the nose.

In operation of the structure comprising my invention, an implement is removed from the tractor in the following manner: The lever 60 is actuated to move the pins 50 and 51 to unlocking position. A jack or horse is placed under the implement frame to support the frame portion 40 at substantially its level when secured to the nose. The tractor is backed away and is ready for another implement. When the tractor is backed away, the frame portion 40 is then in position for the tractor to run under it the next time it is desired to use the implement. It will be understood, of course, that it is not necessary to have an implement propped up in the manner just described, for it may be let fall to the ground and placed on a horse, lifted by a jack, or manually held in a slightly elevated position the next time it is to be used while the tractor is moved forwardly into connecting engagement with the frame portion 40. The advantage of having it propped up so that the frame portion 40 is in substantially position for engagement with the nose is that the entire connecting operation may be performed by a single individual without assistance. It will be clear from the foregoing description that by means of the present invention it is merely necessary to drive a tractor up to an implement, make the supporting and operating connection as described without loss of time, and proceed to use the implement, the frame portion 40 of the implement being rigidly secured against movement in any direction relative to the nose. The connecting and unconnecting operation is simple and may be performed by anyone without any knowledge of the use of tools.

It is to be understood that the foregoing description is merely an example of my invention and that it may take other forms. Accordingly, I do not wish to be limited except by the scope of the following claims.

I claim:

1. A device for securing farm implements and the like having frames of predetermined configurations to a tractor or the like, comprising a nose on the front of the tractor for rigid supporting engagement with an implement frame for pushing and guiding the implement by the tractor, and a plurality of axially movable pins for securing an implement frame to said nose, whereby any one of several implements may be operatively secured to the tractor.

2. A device for securing farm implements and the like having frames of predetermined configurations to a tractor or the like, comprising a tapered nose on the front of the tractor for guiding the frame of an implement onto said nose to be rigidly supported thereby for pushing and guiding by the tractor, and a plurality of axially movable pins for simultaneous cooperation with the implement frame and said nose for securing an implement to the tractor.

3. A device for securing farm implements and the like having frames of predetermined configurations to a tractor or the like, comprising a tapered nose, having sides and a top, on the tractor for guiding the frame of an implement onto said nose to be rigidly supported thereby for pushing and guiding by the tractor, means on the sides and top of said nose for limiting inward movement of an implement frame thereon; and means for securing an implement frame to said nose.

4. A device for securing farm implements and the like having frames of predetermined configurations to a tractor or the like, comprising a nose on the tractor for supporting engagement with an implement frame, a pair of links comprising a toggle mounted in said nose, a pin mounted for axial movement in said nose connected to said toggle for operation thereby, a second pin mounted for axial movement in said nose in a different direction from said first named pin, connected to said toggle for operation thereby, and means for actuating said toggle.

5. A device for securing farm implements and the like having frames of predetermined configurations to a tractor or the like, comprising a nose on the tractor for supporting engagement with an implement frame, a pair of links comprising a toggle mounted in said nose, a pin mounted for axial movement in said nose connected to said toggle for operation thereby, a second pin mounted for axial movement in said nose in a different direction from said first named pin connected to said toggle for movement thereby, and a lever pivoted at one end thereof and pivoted between its ends to said toggle for actuating the same.

6. A device for securing farm implements and the like having frames of predetermined configurations to a tractor or the like, comprising a nose on the tractor for supporting engagement with an implement frame, a pair of links comprising a toggle mounted in said nose, a pair of pins slidably mounted in said nose adjacent the ends of said toggle levers and pivoted to the ends of said toggle levers, respectively, for actuation thereby, a second pair of pins slidably mounted in said nose pivoted to said toggle lever intermediate its ends, respectively, and means for actuating said toggle, whereby said pins may be axially moved into and out of locking engagement with the frame of a farm implement disposed on said nose.

7. The invention as set forth in claim 6, wherein said first named pair of pins is axially movable in a horizontal direction, and said second named pair of pins is axially movable in a vertical direction.

8. A device for securing farm implements and the like, having frames of predetermined configurations, to a tractor or the like, comprising a nose on the front of the tractor for supporting engagement with an implement frame for pushing and guiding the implement by the tractor, said nose being of such a height from the ground as to permit the tractor to move forward to engage the nose with a predetermined portion of an implement frame, means to limit rearward movement of said frame portion with respect to said tractor, and means to lock said implement portion to said nose.

9. In combination, a frame portion for a farm implement or the like, having a generally inverted U-shape, and a nose attached to a tractor or the like, said nose having a supporting surface and camming surfaces for camming said frame portion onto said supporting surface, when said nose is moved forwardly relatively to said frame portion, for rigidly connecting an implement to the tractor or the like for pushing and guiding the implement by the tractor or the like.

10. In combination, a frame portion for a farm implement or the like, having a generally inverted U-shape, and a nose attached to a tractor or the like, said nose having top and side supporting surfaces and camming surfaces for camming said frame portion into supported relation with said supporting surface when said nose is moved forwardly relatively to said frame portion, for rigidly connecting an implement to the tractor or the like for pushing and guiding the implement by the tractor or the like.

11. In combination, a frame portion for an implement or the like, having a generally inverted U-shape, a nose attached to a tractor or the like, said nose having a supporting surface and camming surfaces for camming said frame portion onto said supporting surface when said nose is moved forwardly relatively to said frame portion, for rigidly connecting an implement to the tractor or the like for pushing and guiding the implement by the tractor or the like, and means to lock said nose and frame portion together.

12. In combination, a frame portion for a farm implement or the like, having a generally inverted U-shape, a nose attached to a tractor or the like, said nose having top and side supporting surfaces, and means for camming said frame portion into supporting relation with said nose when said nose is moved forwardly relative to said frame, for rigidly connecting an implement to the tractor or the like for pushing and guiding the implement by the tractor or the like, means to limit rearward movement of said frame portion relatively to said nose, and means to lock said frame portion to said nose.

13. In combination, a frame portion for a farm implement or the like, having a generally inverted U-shape, a nose attached to a tractor or the like, said nose having top and side supporting surfaces, portions of said top and side surfaces comprising means for camming said frame portion into rigid supporting, pushing and guiding relation wtih said nose when said nose is moved forwardly relatively to said frame, means to limit rearward movement of said frame portion relatively to said nose, and means to lock said frame portion to said nose, said means comprising pins disposed within said nose movable outwardly into locking relation with said frame portion.

JAMES M. MARTIN.